Patented Sept. 15, 1936

2,054,088

UNITED STATES PATENT OFFICE 2,054,088

MANUFACTURE OF O- AND PERI-ARYL DINITRILES

Reginald Patrick Linstead and Arthur Reginald Lowe, South Kensington, London, England, assignors to Imperial Chemical Industries Limited, a corporation of Great Britain No Drawing. Application January 10, 1934, Serial No. 706,150. In Great Britain January 13, 1933

10 Claims. (Cl. 260—99.30)

This invention relates to the manufacture of o- and peri-aryl dinitriles.

According to the invention, we manufacture o- and peri-aryl dinitriles by the process which consists in submitting a gaseous mixture comprising ammonia and an o- or peri-aryl-dicarboxylic-acid-anhydride, imide or -mono- or di-amide to a high temperature, while passing over a dehydration catalyst such as alumina or thoria.

The o- or peri-aryl-dicarboxylic acid-anhydride, -imide or -mono- or di-amide may carry simple substituents in the aryl nucleus such as chlorine atoms.

Dehydrating catalysts are described in Sabatier and Reid, "Catalysis in Organic Chemistry", London, 1923, sections 691–818. In speaking of dehydrating catalysts, such as alumina or thoria, we include only those dehydrating catalysts, which like alumina and thoria are solid and stable at the temperatures at which the process of this invention is effected as described hereafter, and which like alumina and thoria do not readily enter into permanent combination with any of the components of the above mentioned gaseous mixture. A particularly suitable dehydrating catalyst, is silica. With this catalyst, yields approaching the theoretical are obtainable, and at the same time this catalyst has remarkable stability. We have seen no evidence that it combines with the aryl dinitriles when formed. When a metal or metal-containing catalyst is employed there is the liability of this interacting with the aryl dinitriles to give a colouring matter (see copending application Ser. No. 698,216 filed November 15, 1933) with consequent interference with the catalytic action. It appears therefore that while other dehydrating catalysts may be used in the process of this invention silica is generally the most convenient. Silica may be used as such, preferably as silica gel, or as a compound or mixture with another compound such as alumina.

By high temperatures we mean primarily temperatures of about 480–500° C., and secondarily temperatures of about 300–550° C. Specific temperatures suitable for different starting materials and catalysts are mentioned in the examples.

In carrying the invention into practical effect the gaseous mixture may be conveniently obtained by vapourizing the aryl-dicarboxylic-acid-anhydride, -imide, or -mono- or di-amide and passing along with ammonia gas over the heated catalyst. Other substances which will give the gaseous mixture containing ammonia and aryl-dicarboxylic-acid-anhydride, -imide, or -mono- and di-amide, such as phthalic acid and ammonia, may be used instead of the aryl-dicarboxylic-acid-anhydride, -imide, or -mono- or di-amide themselves.

The o- and peri-aryl dinitriles obtained according to the above process are valuable intermediates for the manufacture of dyestuffs, for instance for the manufacture of complex nitrogenous colouring matters according to the process of copending application Ser. No. 698,216.

Our invention also includes the use of the aryl dinitriles, which have been prepared according to the above process in the manufacture of the said colouring matters.

The following examples in which parts are by weight illustrate, but do not limit the invention.

*Example 1.*—Molten phthalimide is fed through a horizontal column of thoria maintained at 485–490° C. A vigorous stream of ammonia is also passed through, so that ammonia is always present in the issuing gases. The liquid and gaseous reaction products are condensed in a large cooled receiver. The solid condensate is then broken up and stirred with caustic soda solution to remove unchanged phthalimide and alkali-soluble byproducts. After filtration and washing, there remains almost pure phthalonitrile, melting at 138–140° C.

*Example 2.*—25 parts of phthalimide are heated and the resulting vapour is passed during 1 hour over 288 parts of silica gel maintained at 360° C. A stream of ammonia is also passed with the phthalimide vapour at such a rate that there is always plenty of ammonia present in the issuing gases; this is a rate of about 2.5 cu. ft. per hour if the parts aforementioned are grams. The liquid and gaseous reaction products are condensed in a large cooled receiver. The solid condensate is then powdered and stirred with aqueous caustic soda to remove unchanged phthalimide and alkali-soluble by-products, and to convert any phthalimide into ammonia and alkali-soluble products. After filtration and washing, there remains almost pure phthalonitrile, melting at 138–140° C. The yield is 75% of the theoretical (calculated on the phthalimide).

*Example 3.*—This is a composite example, the general procedure being that of Example 2, except in the particulars tabulated

| Starting material | Catalyst | Time hours | Temperature °C. |
|---|---|---|---|
| Phthalimide | Thoria | 2½ | 445–450 |
| Do | Thoria on pumice | 2 | 450 |
| Do | Thoria on asbestos | 2 | 450 |
| Do | Activated alumina | 1 | 410 |
| Do | Bauxite | 1 | 400 |
| Do | Kaolin | 1 | 440 |
| Do | Kieselguhr | 1 | 485 |
| Phthalic anhydride | Silica gel | 1 | 370 |
| Do | Kieselguhr | 2½ | 485 |
| Phthalic acid diamide | Thoria | 3 | 485–495 |
| 4-chlorophthalimide | Silica gel | ¾ | 500 |
| 1, 2-naphthalimide | ----do---- | ½ | 500 |
| 2, 3-naphthalimide | ----do---- | ½ | 500 |
| 1, 8-naphthalic anhydride | ----do---- | ¾ | 390–440 |

In the claims below the phrase "adjacent positions" is to be understood as a generic term embracing the ortho and peri positions of an aryl compound of the benzene or naphthalene series.

We claim:

1. The process for the manufacture of phthalonitrile, according to which a gaseous mixture comprising phthalimide and ammonia is passed over a dehydration catalyst consisting of silica gel.

2. The process for the manufacture of an aryl-dinitrile having the two cyanogen groups in adjacent positions, which comprises submitting a gaseous mixture, comprising ammonia and an aryl-dicarboxylic acid derivative of the general formula

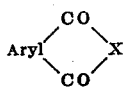

wherein X stands for O or NH, and wherein the CO groups occupy adjacent positions, to a temperature between 300 and 550° C. in the presence of a catalyst which is adapted to transform an amide into a nitrile.

3. The process for the manufacture of an aryl-dinitrile of the benzene and naphthalene series having the two cyanogen groups in adjacent positions, which comprises submitting a gaseous mixture, comprising ammonia and an aryl-dicarboxylic acid derivative of the general formula

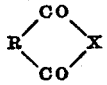

wherein R is a benzene or naphthalene radical, X stands for O or NH, and wherein the CO groups occupy adjacent positions, to a temperature between 300 and 550° C. while passing over a dehydrating catalyst which does not tend to react with phthalimides to form complex metallo-nitrogenous by-products.

4. The process of producing an aromatic ortho-dinitrile of the benzene or naphthalene series, which comprises passing a gaseous mixture of ammonia and an ortho-dicarboxylic-acid-imide of the benzene or naphthalene series in contact with a catalyst containing as active ingredient aluminum oxide at a temperature between 400 and 440° C.

5. The process of producing an aromatic ortho-dinitrile of the benzene or naphthalene series, which comprises passing a gaseous mixture of ammonia and an ortho-dicarboxylic-acid-imide of the benzene or naphthalene series in contact with a catalyst consisting principally of thorium oxide at a temperature between 445 and 495° C.

6. The process of producing an aromatic ortho-dinitrile of the benzene or naphthalene series, which comprises passing a gaseous mixture of ammonia and an ortho-dicarboxylic-acid-imide of the benzene or naphthalene series in contact with a catalyst containing as active ingredient silica at a temperature between 360 and 500° C.

7. The process which comprises passing a mixture of gaseous phthalimide and ammonia over heated thoria at a temperature between 480 and 500° C., condensing the reaction gases and recovering therefrom phthalonitrile.

8. The process which comprises passing a mixture of a gaseous phthalimide and ammonia over heated silica gel at a temperature of about 480 to 500° C., condensing the reaction gases, and recovering therefrom a phthalonitrile.

9. The process for the manufacture of an intermediate for dyestuffs, which comprises submitting a gaseous mixture, comprising ammonia and an ortho-dicarboxylic acid imide of the general formula

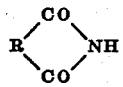

wherein R is a benzene radical, and wherein the CO groups occupy adjacent positions, to a temperature between 300 and 550° C. while passing over a dehydrating catalyst which does not tend to react with phthalimides to form complex metallo-nitrogenous by-products.

10. The process which comprises passing a mixture of gaseous phthalimide and ammonia at a temperature between 300 and 550° C. over a heated dehydrating catalyst which does not tend to react with phthalimides to form complex metallo-nitrogenous by-products, and recovering the reaction product.

REGINALD PATRICK LINSTEAD.
ARTHUR REGINALD LOWE.